United States Patent [19]

Terziev et al.

[11] Patent Number: 5,544,627
[45] Date of Patent: Aug. 13, 1996

[54] ENGINE DESIGN FOR GASOLINE/DIESEL ENGINES

[76] Inventors: Nicola Terziev, 5100 N. Ocean Blvd. Apt. 1407, Ft. Lauderdale, Fla. 33308; Leonid Popov, 29 Clinton Ave. Apt. 1A, Norwalk, Conn. 06854

[21] Appl. No.: 407,854

[22] Filed: Mar. 21, 1995

[51] Int. Cl.⁶ .............................. F16J 1/04; F02B 35/02
[52] U.S. Cl. ...................................... 123/53.1; 123/197.3
[58] Field of Search ............................. 123/664, 193.2, 123/53.1, 53.5, 197.3

[56] References Cited

U.S. PATENT DOCUMENTS

| | | | |
|---|---|---|---|
| 1,335,947 | 4/1920 | Welke | 123/53.1 |
| 1,414,987 | 5/1922 | Loeffler et al. | 123/53.1 |
| 1,515,946 | 11/1924 | Giles | 123/53.1 |
| 2,886,017 | 5/1959 | Dib | 123/53.1 |
| 2,966,145 | 12/1960 | Froehlich | 123/664 |
| 3,766,894 | 10/1973 | Mize | 123/53.1 |
| 4,831,919 | 5/1989 | Bruni | 92/233 |
| 4,951,621 | 8/1990 | Tomita et al. | 123/193.2 |
| 4,957,212 | 9/1990 | Duck et al. | 277/217 |
| 5,058,489 | 10/1991 | Iwaya | 92/233 |
| 5,193,436 | 3/1993 | Hamai et al. | 92/233 |
| 5,211,101 | 5/1993 | Letsch et al. | 92/177 |

FOREIGN PATENT DOCUMENTS

| | | | |
|---|---|---|---|
| 160080 | 8/1952 | Australia | 123/53.1 |
| 3410548 | 9/1985 | Germany | 123/197.3 |
| 586625 | 12/1958 | Italy | 123/53.1 |

*Primary Examiner*—David A. Okonsky
*Attorney, Agent, or Firm*—Collier, Shannon, Rill & Scott, PLLC

[57] ABSTRACT

Improved designs for the internal combustion engine are disclosed. The first embodiment of the invention relates to a configuration in which the cylinder/piston assembly is inclined at an oblique angle relative to the center axis of rotation of the crankshaft and connected to the crankshaft with a curved or bow-shaped connecting rod. The second embodiment of the invention resides in an improved design for the combustion chamber. In this embodiment, the cylinder and piston have elliptical cross sections. This, combined with a concave cylinder head, provide for a ellipsoid shaped combustion chamber. In this chamber are mounted two spark plugs, positioned along the major axis of the ellipse defined by the cylinder cross section. This configuration then sets the stage for the phenomenon called "Dual opposite firing fronts."

2 Claims, 5 Drawing Sheets

ENGINE DESIGN FOR GASOLINE/DIESEL ENGINES

FIELD OF INVENTION

This invention relates to the field of the internal combustion engine. Specifically, it relates to several novel cylinder/piston/connecting rod configurations. More specifically, the novel features of this improved engine design relate to: (1) a combination of a slant cylinder and a bow shaped connecting rod; and (2) an ellipsoid shaped piston, cylinder and combustion chamber.

BACKGROUND OF THE INVENTION

The conventional schematic representation of an internal combustion engine is comprised of circular shaped cylinders and a series of pistons connected to a crankshaft by their respective connecting rods. This configuration contains a piston which is secured to a connecting rod by a piston pin. The connecting rod is manufactured to be as straight as possible so that its central axis is aligned with the central axis of the piston and center of revolution of the crankshaft when in the 0° and 180° positions. The main shortcoming of the conventional engine is that when a piston is in the top dead center ("TDC") position (0°) there is no revolving moment of force being exerted on the crankshaft because the length of a revolving moment arm is 0 in this condition. The brunt of the load is borne by the crankshaft bearings, connecting rod bearing, and piston pin instead of being transferred into a useful revolutionary force to turn the crankshaft. Not only is there is loss of force but there is also the potential for increased wear on the engine due to this misdirected force. There is undue wear on the piston pin, main crankshaft bearing, and connecting rod bearings. In addition, manufactures are always looking for ways to improve the efficiency and output of the internal combustion engine.

In an attempt to diminish this negative effect, manufactures have freedom to change the timing of ignition of the air/fuel mixture in such a way as to transfer load from the piston to crankshaft only after TDC. This solution is unacceptable since TDC is the moment of maximum compression of air/fuel mixture and therefore yields maximal combustion output.

A second shortcoming of the conventional engine due to ineffective construction geometry and characterized by the energy loss associated with the transfer power between piston and crankshaft. On average, there is a loss of 8% of the energy, generated by the process of combustion, in the transfer of vertical motion of a piston to revolutionary motion of the crankshaft. The present invention has solved these problems (0 momentum of force at TDC and 8% power transfer loss) by altering both the angle of the cylinder/piston configuration's central axis to the center line of the crankshaft and varying the shape of the connecting rod.

Another shortcoming of current engine technology resides in the combustion chamber itself. Conventional engines are comprised of cylinders and pistons with circular or nearly circular cross sections. This configuration produces unfocused, multi-directional and relatively slow propagation rates of combustion in the time period immediately following the spark. An alternate embodiment of the present invention proposes to radically alter the geometry of the combustion chamber and thus increase power and torque with no resultant loss in fuel economy or reliability.

PRIOR ART

U.S. Pat. No. 4,831,919 to Bruni, is directed to an asymmetric oval piston. The piston appears to be somewhat egg-shaped. The invention attempts to improve performance with respect to noise reduction, stability and scuffing by machining a piston to be slightly out of round to allow for asymmetric polar profiles about the plane which includes both the piston axis and the minor axis over at least a part of the piston skirt length. The shape of the cylinder is not affected.

U.S. Pat. No. 4,957,212 to Duck et al., is directed to non-circular piston rings. The shapes of the piston and cylinder are unaffected. The rings are elliptical or oval in shape. The design is supposed to exert less radial contact pressure than a conventional ring and therefor reduce wear and ultimately leakage.

U.S. Pat. No. 5,058,489 to Iwaya, is directed to a piston structure for an internal combustion engine. The piston is comprised of an oval skirt with an elliptical cross section which is designed to deform into a circular cross section in reaction to a force in order to provide uniform contact with the cylinder wall. The cylinder remains circular in shape.

U.S. Pat. No. 5,193,436 to Hamai et al., is directed to an engine piston. The invention describes the shape of a skirt below the piston head in an internal combustion engine. The skirt has an elliptical horizontal cross section. This skirt also contains a T-shaped projection on its lateral surface. This design is intended to reduce friction and wear between the piston and the cylinder.

U.S. Pat. No. 5,211,101 to Letsch et al., is directed to a piston with oval shaped lands. The piston is comprised of a separate head and skirt. The piston contains several lands, at least two of which are oval and are aligned with the major diameter of the piston which is also in the shape of an oval. The cylinder remains circular in shape.

OBJECTS OF THE INVENTION

It is therefore an object of the invention to decrease potential and unnecessary wear on bearings and other engine parts.

It is another object of the invention to produce positive work when a piston is in the top dead center position.

It is yet another object of the invention to eliminate the inherent inefficiency in the current piston-connecting rod-crankshaft configuration of a typical internal combustion engine.

It is a further object of the invention to develop an engine configuration to eliminate the lag of main driving force.

It is an additional object of the invention to provide a novel shaped connecting rod.

It is yet another object of the invention to increase both the horse power and torque of an engine.

It is a still further object of the invention to provide a novel shaped combustion chamber for an internal combustion engine.

It is an additional object of the invention to provide a novel shape for the combustion chamber, cylinder, and piston.

It is another object of the invention to improve fuel economy of the internal combustion engine and to prolong an engine's life.

It is a yet further object of the invention to provide an engine with improved power characteristics and no resultant loss in fuel economy.

SUMMARY OF THE INVENTION

In an effort to achieve the aforementioned objects of the invention, the applicants provide in the first embodiment of the invention: a novel configuration which comprises a cylinder whose center line axis is at an oblique angle to the vertical axis and piston connected to the crankshaft through a connecting rod which is bow shaped. This configuration allows for, not only a more efficient transfer of power, but eliminates potential and unnecessary wear on the piston pin, the crankshaft main bearings, and connecting rod bearings. Additionally, the transfer of force from the piston to the crankshaft is significantly more efficient and therefore undiminished.

At the point of maximum energy output in a conventional engine, the useable power output is reduced by approximately 10% because the driving (revolving) force on the connecting rod is less than the ideal force (of gas expansion) as calculated in the equation:

$$F1 = F \times \cos(A)$$

Where F1 is the driving force, F is the ideal force and A is the angle between the center vertical line of the piston and connecting rod at any given point in the revolutionary cycle of the crankshaft. In other words, the efficiency of the conventional engine is decreased by approximately 10% due simply to construction geometry of the engine. The instant invention has solved this problem by altering both the angle of the cylinder/piston configuration to the center line (of revolution) of the crank shaft and varying the shape of the connecting rod between the piston and the crank shaft.

The second embodiment of the invention involves a change to the geometry of the piston, cylinder and combustion chamber. This alternate embodiment contemplates an ellipsoid shape of the combustion chamber as formed by both the shape of the piston and cylinder wall (which have elliptical cross sections) in two directions such that the piston head is concave and the cylinder head is concave. The combustion chamber will then be formed in the shape of an ellipsoid with an elliptical cross section in at least two directions. The combustion chamber will contain two spark plugs positioned along the major axis of the ellipsoid. These spark plugs are to be placed at as great a distance from each other as feasible. This configuration generates a noticeable increase in torque of the engine.

DETAILED DESCRIPTION OF THE INVENTION

Figure 1:
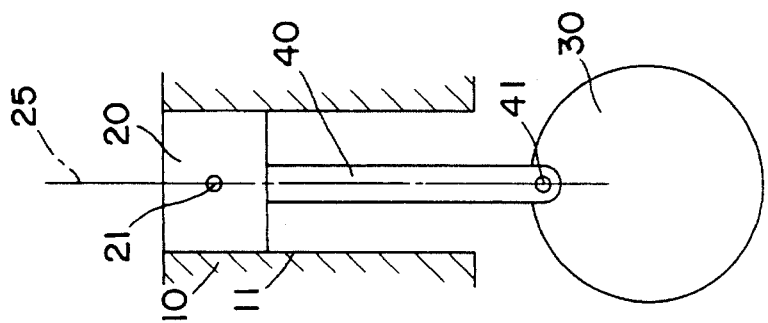
FIG. 1 is a cross section schematic illustration of a conventional cylinder, piston, and connecting rod configuration.

The first embodiment of the invention will now be described in further detail. Referring now to the drawings, FIG. 1 is a diagram of a conventional engine configuration. Piston 20 is situated within cylinder 10 which is defined by cylinder wall 11. Piston 20 is connected to connecting rod 40 by means of piston pin 21. It is also mechanically related to the crank shaft 30 via connecting rod 40. Connecting rod 40 is rotatably mounted to crankshaft 30 by connecting rod bearing 41. The piston reciprocates vertically within the cylinder and thereby turns crank shaft 30. In this configuration the center line axis 25 of the cylinder and the piston are aligned such that they intersect the center line axis of the crankshaft. The power of expansion of gases unleashed by the combustion process in the combustion chamber is exerted at the top of the piston in the form of a downward vertical force.

This causes the piston to slide along the internal cylinder wall and transfer power through the connecting rod to the crankshaft in a form of revolving energy (moment). The crankshaft, in turn, transfers this energy to general engine output specifically to be determined by whatever the desired property is; either to turn wheels in an automobile, a propeller on a boat, a blade on a lawn mower, etc. This configuration can also be used for a gas compressor, liquid pump, or any other system which requires power generation.

Figure 2C:
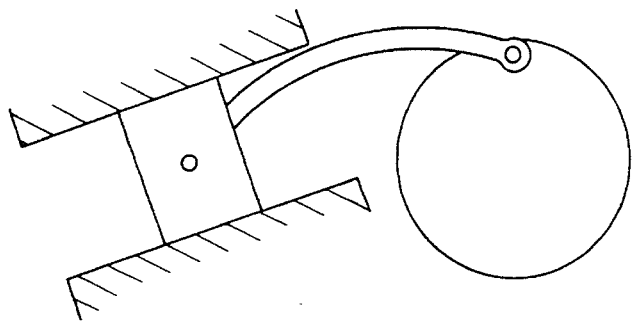
FIGS. 2(a)–(c) are cross section schematic illustrations of the inventive cylinder, piston, and connecting rod configuration at various points in the crankshaft cycle.
Figure 2B:
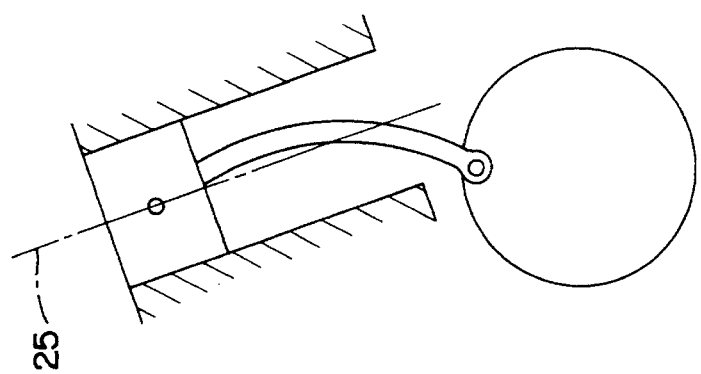
Figure 2A:
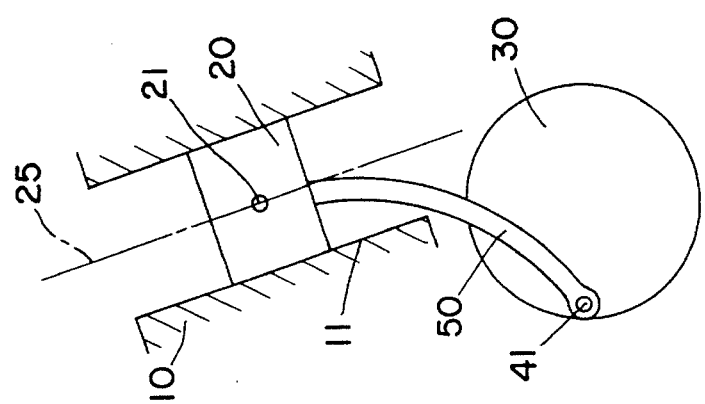

In FIG. 2(a)–(c) a schematic cross section is shown of the inventive concept. Each element of the current conventional engine is present in the instant invention. There are however several modifications. First among these is that the central axis 25 of the cylinder is now at an oblique angle to the traditional angle of a conventional engine. As can be seen by a comparison of FIGS. 1 and 2(a), the center line axis of the cylinder does not align and does not intersect with the central axis of revolution of the crankshaft. It is contemplated that the angle of offset will be in the range of 1°–45°. The exact angle however determined by the interplay of the diameter of the crank shaft, the diameter of the cylinder, and the radius of curvature of the inventive connecting rod.

Second among the differences is the shape of the connecting rod 50 shown in FIG. 2(a). This connecting rod is curved to facilitate the required connection with the crankshaft 30 at the connecting rod bearing 41. It is this bow-shaped connecting rod which allows the slant cylinder to transfer power in a vastly improved manner from that of a traditional configuration.

FIGS. 2(a)–(c) show the inventive configuration in the 270°, 0° and 90° positions respectively. The radius of curvature of the bow-shaped connecting rod is varies based on piston and crankshaft diameter and also other engine considerations.

Ultimately, the configuration is dictated by the restriction that the connecting rod must operate free of the cylinder walls. As in a traditional engine, the pressure of gases generated from the combustion process in the combustion chamber is transferred to the piston head. Again the piston travels through the cylinder along the cylinder walls. In this case, as the cylinder is at an oblique angle to the vertical, once again, the force is transferred from the piston to the crank shaft by a connecting rod. However, in the instant invention, since the connecting rod is bow shaped and the piston is at an oblique angle to the vertical, the force is transferred in a different manner. Specifically, the revolving moment of the crankshaft is completely different. When the piston is at TDC, there is positive revolving momentum on the crankshaft as opposed to the zero revolving momentum present in a conventional engine at TDC.

With respect to the improved wear characteristics of the engine, the following situation exists. In times of severe conventional engine overload (defined as a time when the crankshaft is unable to normally turn due to some overload on the drive train), the combustion process does not stop. Therefore, power continues to be generated in the combustion chamber. This energy expansion of gases now must be unproductively absorbed by the piston, the piston pin, connecting rod, and bearings configuration until the crankshaft can begin normally turning again. Each of these components are deformed and damaged in this situation. This effect is called "pinging". This phenomenon can also be realized through the use of the wrong type of fuel or incorrect ignition timing. Fuel with a lower octane rating will cause pinging due to an incorrect speed of detonation of air/fuel mixture. This problem is alleviated by the instant invention to a great extent (approximately 70%).

The inventive connecting rod is configured in a bow-manner such that it can undergo non-flexible deformation and therefore temporarily absorb excess energy from the combustion chamber. This absorption of energy in non-flexible deformation will occur while the crankshaft is restricted due to severe overload. The energy of the expansion of gases is now temporarily stored in the bow-type connecting rod as opposed to immediately transferred to the bearings and piston pin where it may damage engine components or be dissipated as heat and noise. In the inventive case, this temporarily stored energy can be released to the crankshaft when the crankshaft position is between 67°–180°. We expect approximately 75% recovery rate of the energy that would normally be lost from a severe overload condition. It is anticipated that the first 67° of rotation from top dead center would be the storing of the energy and between 67°–180° of rotation of the crankshaft would constitute the release of that stored energy.

Figure 3:
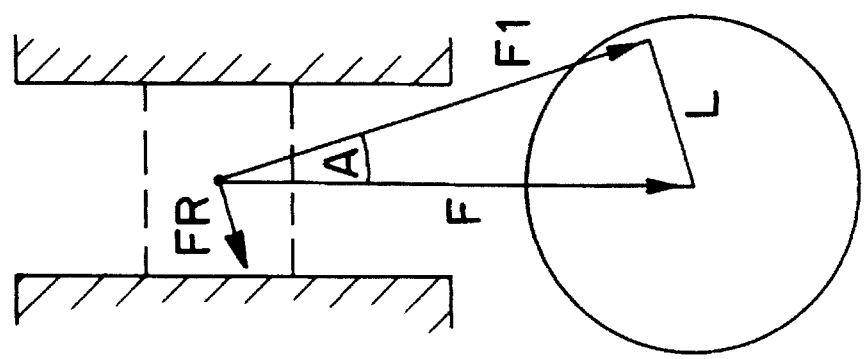
FIG. 3 is a diagram illustrating the ideal and real forces exerted on a crankshaft in a conventional engine.

FIG. 3 is a representation of the basis parallelogram of forces used to illustrate the forces present in the internal combustion engine. The main force F is divided into force F1 which is the force applied along the connecting rod and the reactive force FR which produces no usable power in the engine. It is generally responsible for engine wear and frictional force against the cylinder wall. Angle A is the angle between the main force F and the applying force F1. Equation 1 represents the relationship between F and F1:F1= F×Cos (A). This equation demonstrates the relationship between the two forces insofar as F1 is less than the ideal force F by the Cosine of angle A. This reduction in force is on the order of 8–10%.

L represents the distance (arm) of the revolving moment of the crank shaft. It is defined by the distance from the center of revolution perpendicular to the direction of the applied force F1. The revolving moment of force is calculated by multiplying the distance (arm) L by the applying force F1. Equation 2 is: M(F)=F1×L. The relationship between F and F1 is such that F1 is approximately 10% less then F, translates into a lowering of the revolving momentum of force of approximately the same 10% and therefore resulting in 10% less overall engine output.

Figure 5:
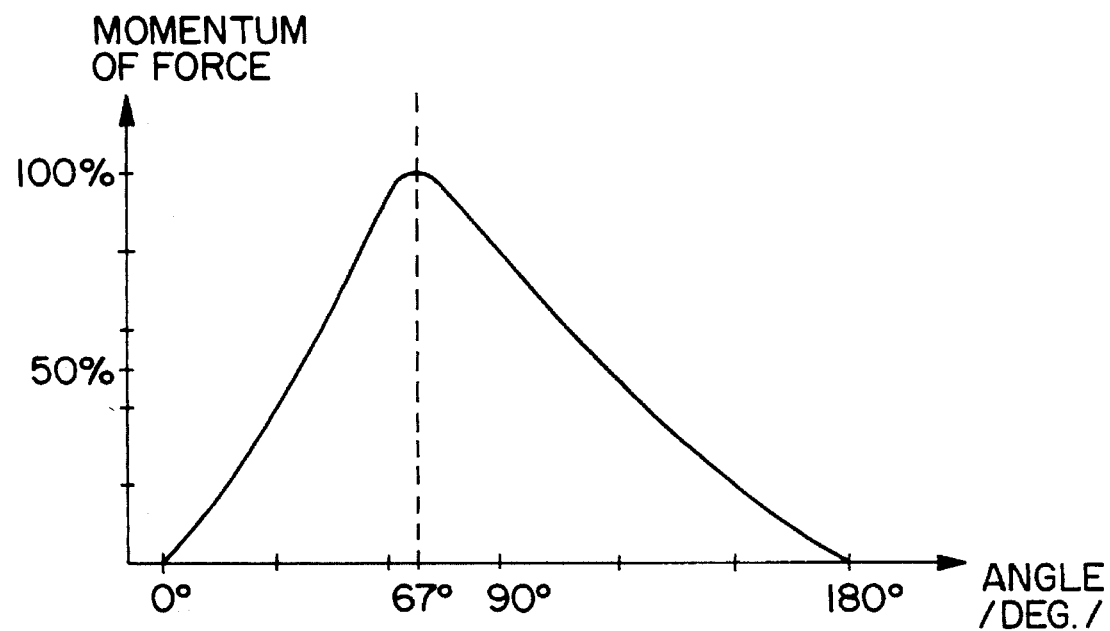
FIG. 5 is an illustration of the momentum of force as a function of degrees of rotation of the crankshaft for the conventional engine configuration.

FIG. 5 is a representation of the conventional engine's revolving momentum of force as a function of the revolving angle of the crankshaft. At 0° of revolution, there is zero revolving momentum of force. The maximum of force is present at 67° of rotation. The moment of force then decreases to zero at an angle of 180°.

Figure 4:
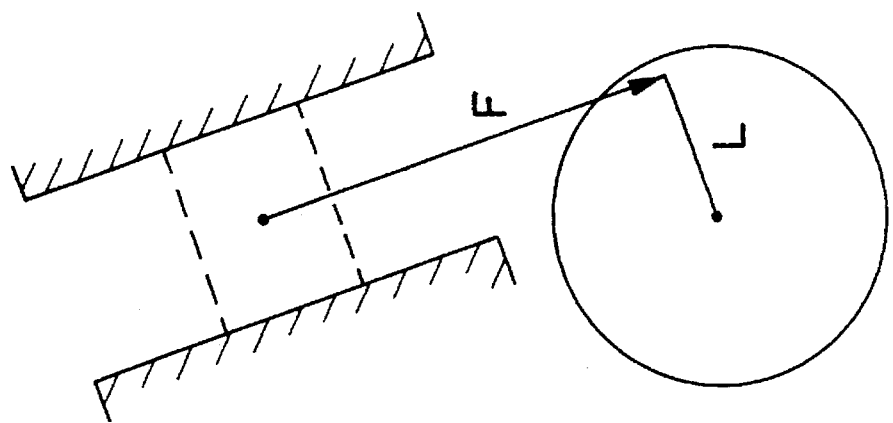
FIG. 4 is a diagram illustrating the force exerted on a crankshaft in the inventive engine configuration.

FIG. 4 represents the force "parallelogram" for the instant invention. In FIG. 3, the parallelogram is constructed to illustrate the maximum revolving moment of force. In FIG. 4, there is not parallelogram of force because angle A between the applied force and the actual force does not exist. This means that the force F is the "ideal" force and can be applied in full amount directly to the same arm. Equation 3 represents the revolving momentum of force for the inventive configuration where the moment of force is equal to the basic force times the arm of distance: M(F)=F×L. As can be seen from the configuration, there is no reduction in force due to a difference between the angle applied and ideal force. Since this undiminished force may now be applied to the crankshaft, we have an approximately 10% increase in power transfer of the engine. This moment of force translates into an approximately 10% increase of the total output of the engine.

Figure 6:
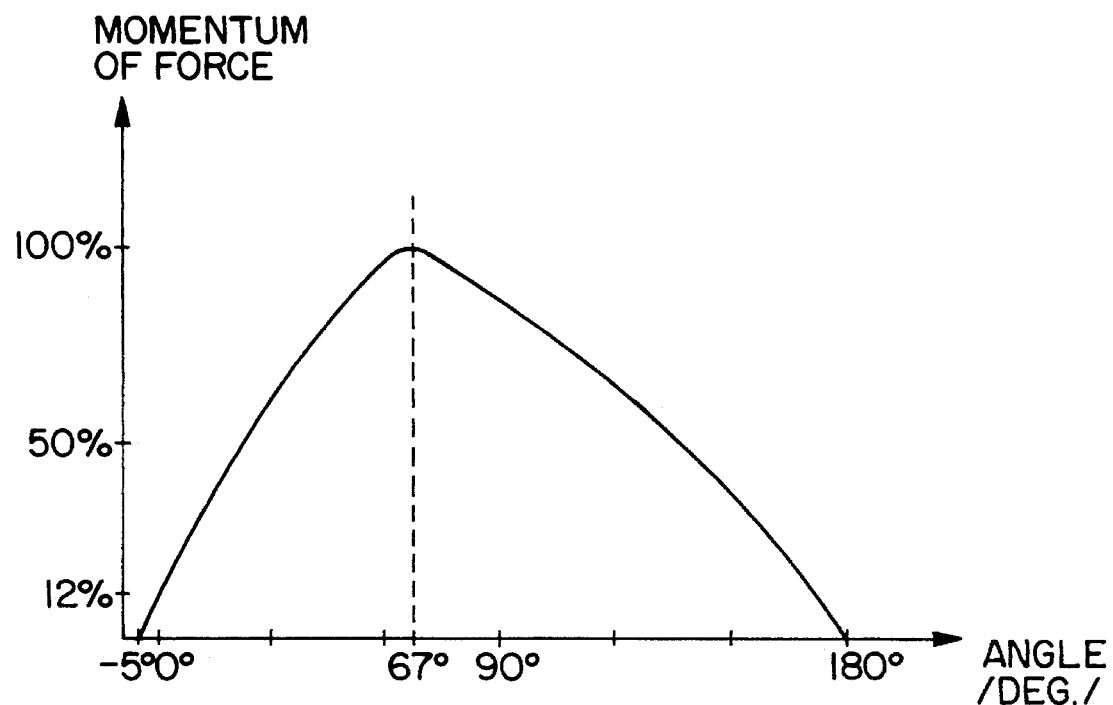
FIG. 6 is an illustration of the momentum of force as a function of degrees of rotation of the crankshaft for the inventive configuration.

FIG. 6 is a representation of the revolving momentum of force as a function of the angle of rotation for the inventive slant cylinder. As can be seen from the graph, the zero revolving momentum of force is present at a position of minus 5° of rotation of the crank shaft as opposed to zero with the conventional engine. At 0° there is a 12% moment of force. The power peak is still present at 67°. The power is reduced again to zero at 180°.

Figure 7:
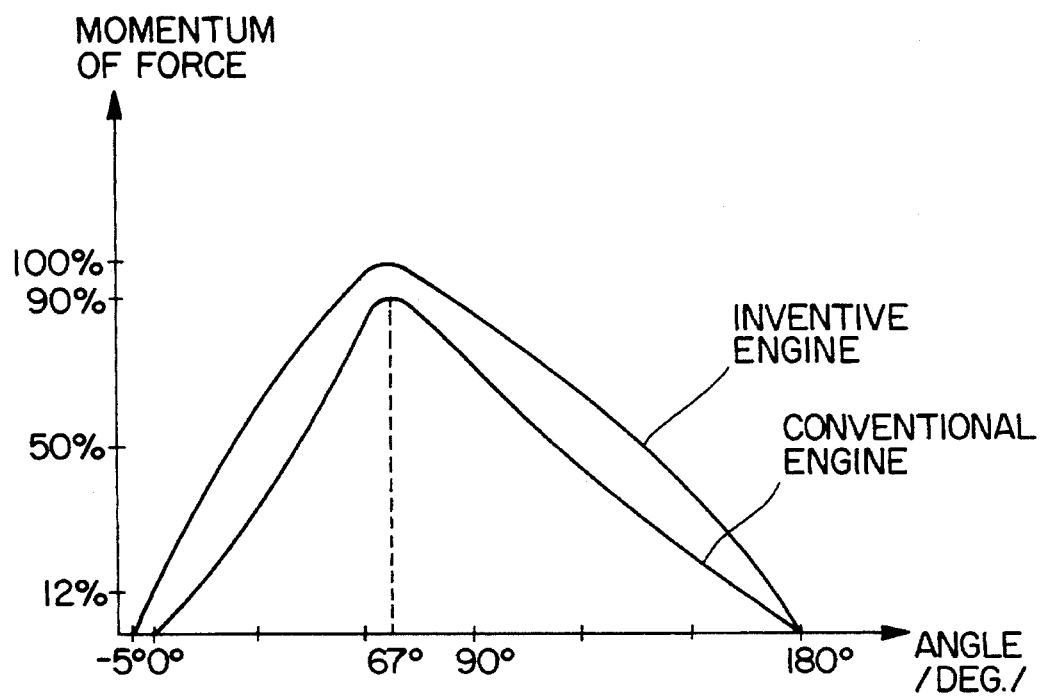
FIG. 7 is a comparison of the momentum of force as a function of degrees of rotation of the crankshaft for the conventional and inventive configurations.
Figure 8:
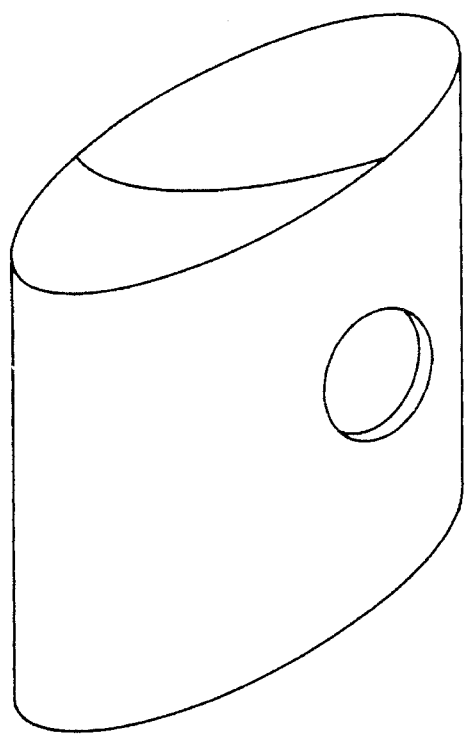
FIG. 8 is an oblique view of the inventive piston having an elliptical cross section with a concave top surface.

FIG. 7 is a comparison of the moment of force graphs between the conventional engine and the inventive slant cylinder engine. As can be seen from this figure, the power range of the inventive slant engine is greater.

In a preferred embodiment of this invention, the cylinder and piston will be configured to have elliptical cross section. This shape will provide greater room for the movement of the connecting rod in order to insure that there will be no conflict between the movement of the connecting rod and the cylinder walls. In this preferred embodiment, the reciprocating movement of the connecting rod is in line with the major axis of the ellipse thereby providing the most room for back and forth movement of the bow-type connecting rod.

Figure 9:
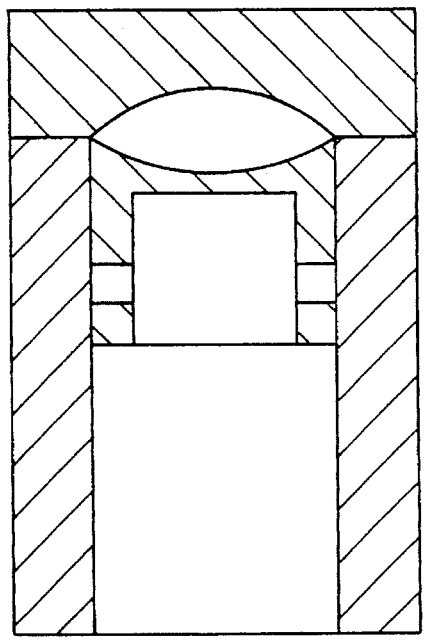
FIG. 9 is a cross sectional illustration of the ellipsoid combustion chamber.

FIG. 9 shows a second embodiment of the present invention referred to as the ellipsoid combustion chamber. It is comprised of an ellipsoid shaped combustion chamber as formed by both the elliptical shape of the piston and cylinder wall cross sections and the fact that the piston head is concave and the cylinder head is concave. The combustion chamber will then be formed in the shape of an ellipsoid with an elliptical cross section in at least two directions. The combustion chamber will also contain two spark plugs positioned along the major axis of the ellipsoid. These spark plugs are to be placed at as great a distance from each other as feasible.

This configuration generates a noticeable increase in torque of the engine. This increase torque is due to the phenomenon of collision of dual, opposite firing fronts which are generated by two opposite spark plugs within the combustion chamber. These firing fronts accelerate toward each other. The shape of the combustion chamber operates to focus the firing front in one direction much as a lens. The direction of propagation of the firing fronts is toward the center of the combustion chamber (and each other). A firing front or propagation front is the locus at which the fuel-air mixture is beginning to ignite. This focusing combustion chamber configuration causes the opposite fronts to accelerate toward each other a significantly greater rate than would in a normal round cross section combustion chamber. Upon meeting, these speeding firing fronts collide and produce a significantly greater force to be exerted on the top of the piston. Upon collision, there is no unburned fuel air mixture left in the combustion chamber.

Figure 10:
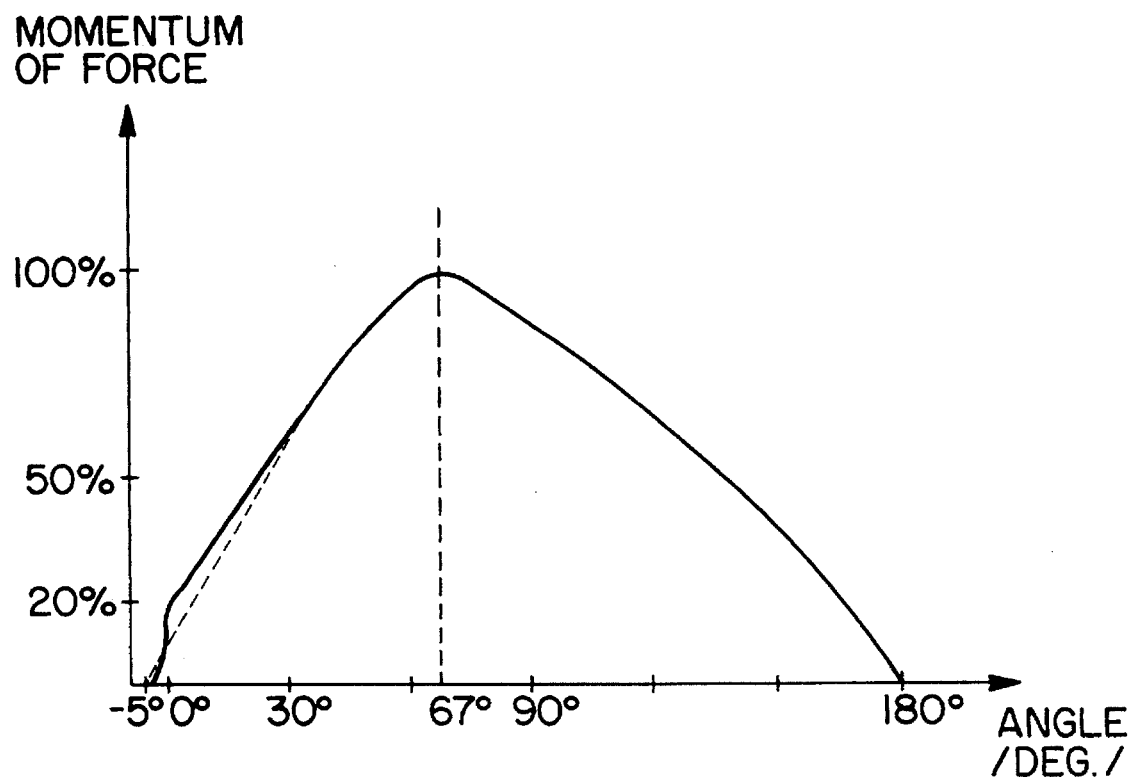
FIG. 10 is a graph of the momentum of force as a function of degrees of rotation of the crankshaft for the inventive configuration with ellipsoid cylinder/piston/combustion chamber.

Due to the focused acceleration, the collision is such that it creates a surge of power which is up to 20% greater that the power of conventional combustion the air/fuel mixture transferred to the piston head. This power increase is illustrated by the graph (FIG. 10) showing that while the traditional peak power is at 67° of rotation, there is a noticeable increase i.e., 20% at the 0° of rotation position. This is to be compared with a convention engine which has zero momentum of force at 0° rotation (FIG. 5). The graph illustrates the immediate nature of the increase in power. Shortly after the collision of the propagation fronts (at a approximately 30° of rotation) the power curve for the inventive cylinder returns to that of a conventional combustion engine.

Certain other advantages of this ellipsoid combustion chamber are: (1) Engine block length may be reduced by up to 40% as the elongated cylinders may be placed closer together; (2) Engine weight is reduced thus offering an increase in fuel economy; (3) For a narrow angled engine, the different banks of cylinders can be offset in zipper fashion thereby creating greater efficiencies and less dead space in the engine; (4) The layout of the engine compartment and shape of the car in general may be altered.

It will be apparent to those skilled in the art that various modifications and variations can be made to the construction and configuration of the present invention without departing from its scope or spirit. The above description is meant to be illustrative only and not in any way limiting on the scope of the appended claims.

We claim:

1. An improved engine configuration which comprises:

a cylinder with an elliptical cross section;

a piston with an elliptical cross section;

a crankshaft; and a bow-shaped connecting rod connected to said crankshaft via a crank pin;

wherein the centerline axes of the cylinder and piston are at an oblique angle to a plane which passes through the axis of revolution of the crankshaft and through said crank pin when said piston is at top dead center.

2. The engine configuration of claim 1 wherein the centerline axes of the cylinder and piston do not intersect the center line axis of the crankshaft.

\* \* \* \* \*